US009432632B2

(12) United States Patent
Cheng et al.

(10) Patent No.: US 9,432,632 B2
(45) Date of Patent: Aug. 30, 2016

(54) ADAPTIVE MULTI-MODAL INTEGRATED BIOMETRIC IDENTIFICATION AND SURVEILLANCE SYSTEMS

(71) Applicant: Proximex Corporation, Cupertino, CA (US)

(72) Inventors: Ken P. Cheng, Saratoga, CA (US); Edward Y. Chang, Santa Barbara, CA (US); Yuan-Fang Wang, Goleta, CA (US)

(73) Assignee: Proximex Corporation, Cupertino, CA (US)

( * ) Notice: Subject to any disclaimer, the term of this patent is extended or adjusted under 35 U.S.C. 154(b) by 0 days.

(21) Appl. No.: 14/607,201

(22) Filed: Jan. 28, 2015

(65) Prior Publication Data

US 2015/0138332 A1 May 21, 2015

Related U.S. Application Data

(60) Division of application No. 13/738,655, filed on Jan. 10, 2013, now Pat. No. 8,976,237, and a continuation of application No. 13/101,149, filed on May 5, 2011, now Pat. No. 8,373,753, and a division of application (Continued)

(51) Int. Cl.
*H04N 7/18* (2006.01)
*A61B 1/00* (2006.01)
(Continued)

(52) U.S. Cl.
CPC ........... *H04N 7/18* (2013.01); *G06K 9/00* (2013.01); *G06K 9/00288* (2013.01);
(Continued)

(58) Field of Classification Search
USPC ........... 348/77; 340/506; 358/143, 147, 161, 358/169; 707/4, 103; 382/103, 209, 276, 382/277, 289, 291, 293, 294, 295, 282, 305, 382/115, 107, 190
See application file for complete search history.

(56) References Cited

U.S. PATENT DOCUMENTS 5,258,837 A   11/1993   Gormley
5,473,369 A   12/1995   Abe
(Continued)

FOREIGN PATENT DOCUMENTS

WO   2007/044037 A1   4/2007

OTHER PUBLICATIONS

PCT/US05/44656 International Search Report and Written Opinion, Jun. 26, 2006.
(Continued)

*Primary Examiner* — Jerome Grant, II
(74) *Attorney, Agent, or Firm* — Dean D. Small; The Small Patent Law Group, LLC.

(57) ABSTRACT

A surveillance system is provided that includes at least one sensor disposed in a security area of a surveillance region to sense an occurrence of a potential security breach event; a plurality of cameras is disposed in the surveillance region; at least one camera thereof has a view of the security area and can be configured to automatically gather biometric information concerning at least one subject person in the vicinity of the security area in response to the sensing of a potential security breach event; one or more other of the plurality of cameras can be configured to search for the at least one subject person; a processing system is programmed to produce a dossier corresponding to the at least one subject person to match biometric information of one or more persons captured by one or more of the other cameras with corresponding biometric information in the dossier.

35 Claims, 8 Drawing Sheets

Apply Monitoring Rule on Security Area

Related U.S. Application Data

No. 11/231,353, filed on Sep. 19, 2005, now Pat. No. 7,956,890.

(60) Provisional application No. 60/610,998, filed on Sep. 17, 2004.

(51) Int. Cl.
    *G06K 9/00*         (2006.01)
    *G06K 9/62*         (2006.01)
    *G08B 13/196*     (2006.01)
    *G06T 7/40*         (2006.01)

(52) U.S. Cl.
CPC ..... *G06K 9/00771* (2013.01); *G06K 9/00885* (2013.01); *G06K 9/00892* (2013.01); *G06K 9/6293* (2013.01); *G06T 7/408* (2013.01); *G08B 13/196* (2013.01); *H04N 7/181* (2013.01)

(56) References Cited

U.S. PATENT DOCUMENTS

| | | |
|---|---|---|
| 5,479,574 A | 12/1995 | Glier et al. |
| 5,701,398 A | 12/1997 | Glier et al. |
| 5,769,074 A | 6/1998 | Barnhill et al. |
| 5,835,901 A | 11/1998 | Duvoisin et al. |
| 5,838,465 A | 11/1998 | Satou et al. |
| 5,912,980 A | 6/1999 | Hunke |
| 6,008,912 A | 12/1999 | Sato et al. |
| 6,072,496 A | 6/2000 | Guenter et al. |
| 6,157,469 A | 12/2000 | Mestha |
| 6,248,063 B1 | 6/2001 | Barnhill et al. |
| 6,306,087 B1 | 10/2001 | Barnhill et al. |
| 6,335,985 B1 | 1/2002 | Sambonsugi et al. |
| 6,404,900 B1 | 6/2002 | Qian et al. |
| 6,408,404 B1 | 6/2002 | Ladwig |
| 6,591,224 B1 | 7/2003 | Sullivan et al. |
| 6,604,093 B1 | 8/2003 | Etzion et al. |
| 6,609,198 B1 | 8/2003 | Wood et al. |
| 6,625,315 B2 | 9/2003 | Laumeyer et al. |
| 6,628,829 B1 | 9/2003 | Chasen |
| 6,697,103 B1 | 2/2004 | Fernandez et al. |
| 6,707,487 B1 | 3/2004 | Aman et al. |
| 6,711,587 B1 | 3/2004 | Dufaux |
| 6,757,668 B1 | 6/2004 | Goebel et al. |
| 6,906,709 B1 | 6/2005 | Larkin et al. |
| 6,909,745 B1 | 6/2005 | Puri et al. |
| 6,944,319 B1 | 9/2005 | Huang et al. |
| 6,963,899 B1 | 11/2005 | Fernandez et al. |
| 6,968,006 B1 | 11/2005 | Puri et al. |
| 6,970,513 B1 | 11/2005 | Puri et al. |
| 6,970,582 B2 | 11/2005 | Langley |
| 6,976,207 B1 | 12/2005 | Rujan et al. |
| 7,023,913 B1 | 4/2006 | Monroe et al. |
| 7,028,034 B2 | 4/2006 | Wesinger et al. |
| 7,058,204 B2 | 6/2006 | Hildreth et al. |
| 7,116,353 B2 | 10/2006 | Hobson et al. |
| 7,127,464 B2 | 10/2006 | Wesinger et al. |
| 7,136,524 B1 | 11/2006 | Goh et al. |
| 7,187,783 B2 | 3/2007 | Moon et al. |
| 7,196,722 B2 | 3/2007 | White et al. |
| 7,213,174 B2 | 5/2007 | Dahlquist et al. |
| 7,242,423 B2 | 7/2007 | Lin |
| 7,242,810 B2 | 7/2007 | Chang |
| 7,269,591 B2 | 9/2007 | Wesinger et al. |
| 7,277,485 B1 | 10/2007 | Puri |
| 7,286,687 B2 | 10/2007 | Lindwurm et al. |
| 7,295,228 B2 | 11/2007 | Roberts et al. |
| 7,319,796 B1 | 1/2008 | Sharp |
| 7,366,174 B2 | 4/2008 | MacFaden et al. |
| 7,382,249 B2 | 6/2008 | Fancella |
| 7,384,590 B2 | 6/2008 | Kelly et al. |
| 7,385,590 B2 | 6/2008 | Millar et al. |
| 7,412,112 B2* | 8/2008 | Yamasaki .......... G06K 9/00785 345/626 |
| 7,456,727 B2 | 11/2008 | Pinter et al. |
| 7,522,186 B2 | 4/2009 | Arpa et al. |
| 7,525,576 B2 | 4/2009 | Kannermark et al. |
| 7,596,240 B2* | 9/2009 | Ito .................... G08B 13/19602 382/103 |
| 7,746,380 B2 | 6/2010 | Maruya et al. |
| 7,777,783 B1 | 8/2010 | Chin et al. |
| 8,373,753 B2* | 2/2013 | Cheng ................ G06K 9/00771 348/143 |
| 2001/0048765 A1 | 12/2001 | Yi et al. |
| 2002/0097322 A1 | 7/2002 | Monroe et al. |
| 2002/0138768 A1 | 9/2002 | Murakami et al. |
| 2002/0190119 A1 | 12/2002 | Huffman |
| 2003/0107653 A1 | 6/2003 | Utsumi et al. |
| 2003/0169908 A1 | 9/2003 | Kim et al. |
| 2003/0202102 A1 | 10/2003 | Shiota et al. |
| 2004/0001149 A1 | 1/2004 | Smith |
| 2004/0022442 A1 | 2/2004 | Kim |
| 2004/0081338 A1 | 4/2004 | Takenaka |
| 2004/0100563 A1 | 5/2004 | Sablak et al. |
| 2004/0117638 A1* | 6/2004 | Monroe ............. G06K 9/00221 713/186 |
| 2004/0136574 A1 | 7/2004 | Kozakaya et al. |
| 2005/0052532 A1 | 3/2005 | Elooz et al. |
| 2005/0100209 A1 | 5/2005 | Lewis et al. |
| 2005/0132414 A1 | 6/2005 | Bentley et al. |
| 2005/0222810 A1 | 10/2005 | Jakobson et al. |
| 2005/0265607 A1 | 12/2005 | Chang |
| 2006/0017807 A1 | 1/2006 | Lee et al. |
| 2006/0112039 A1 | 5/2006 | Wang et al. |
| 2006/0203090 A1 | 9/2006 | Wang et al. |
| 2006/0221184 A1 | 10/2006 | Vallone et al. |
| 2006/0279628 A1 | 12/2006 | Fleming |
| 2006/0284978 A1 | 12/2006 | Girgensohn et al. |
| 2007/0146484 A1 | 6/2007 | Horton et al. |
| 2007/0154088 A1 | 7/2007 | Goh et al. |
| 2008/0068464 A1 | 3/2008 | Kitagawa et al. |
| 2008/0079554 A1 | 4/2008 | Boice |
| 2008/0088706 A1 | 4/2008 | Girgensohn et al. |
| 2008/0106597 A1 | 5/2008 | Amini et al. |
| 2008/0130949 A1 | 6/2008 | Ivanov et al. |
| 2008/0218590 A1 | 9/2008 | Park et al. |
| 2008/0294588 A1 | 11/2008 | Morris et al. |
| 2009/0322873 A1* | 12/2009 | Reilly ................ G01S 7/411 348/143 |
| 2010/0002082 A1 | 1/2010 | Buehler et al. |

OTHER PUBLICATIONS

PCT/US05/43808 International Search Report and Written Opinion, Oct. 10, 2007.

PCT/US05/33378 International Search Report and Written Opinion, Apr. 26, 2006.

PCT/US05/33750 International Search Report and Written Opinion, May 2, 2007.

PCT/US05/16961 International Search Report and Written Opinion, Oct. 17, 2006.

VidSys. Inc. Complaint filed in the US District Court for the Eastern district of Virginia on Oct. 19, 2010.

Redstone Integrated Solutions Documents, 2003, Dec. 2003.

95/001,525 Reexamination Request for 7,777,783, filed Jan. 21, 2011.

Goh et al., "Robust Perceptual Color Identification" U.S, Appl. No. 11/229,091, filed Sep. 16, 2005.

Dec. 1997, Belhumeur, A., et al. (1997), "Eigenfaces vs. Fisherfaces: recognition using class specific linear projection", IEEE Transactions on Pattern Analysis and Machine Intelligence 19(7): 711-720.

Brunei, R. and D. Falavigna (1995), "Person Identification using multiple clues," IEEE Transactions on Pattern Analysis and Machine Intelligence 17(10): 955-966, Dec. 1995.

(56) References Cited

OTHER PUBLICATIONS

Brunelli, R., et al. (1995), "Automatic Person Recognition by Using Acoustic and Geometric Features", Machine Vision and Applications 8: 317-325, Dec. 1995.

Hong, Lin and Anil K. Jain. (1998). "Integrating faces and fingerprints for personal identification," IEEE Transactions on Pattern Analysis and Machine Intelligence 20(12): 1295-1307.

International Search Report mailed on Apr. 2006 for PCT Patent Application No. PCT/US05/33378 filed on Sep. 19, 2005, one page.

Jain, A.K., et al., (1997). "On-Line fingerprint Verification", IEEE Transactions on Pattern Analysis and Machine Intelligence archive 19{4}: 302-314, Dec. 1997.

Kittler, J. et al. (1998). "On Combining classifiers", IEEE Transactions on Pattern Analysis and Machine Intelligence 20 (3): 226-239, Dec. 1998.

Lu X et al. (2003). "Combing Classifiers for face recognition", IEEE International Conference on Multimedia Systems and Expo, Baltimore, MD, Jul., Dec. 2003.

Maio, D. et al. (2002). "FVC2000: fingerprint verification competition", IEEE Transactions on Pattern Analysis and Machine Intelligence 24(3): 402-412, Dec. 2002.

Phillips, P.J. et al. (2000). "The FERET evaluation methodology for face-recognition algorithms", IEEE Transactions on Pattern Analysis and Machine Intelligence 22(10): 1090-1104, Dec. 2000.

Senior, A. (2001). A combination fingerprint classifier:, IEEE Transactions on Pattern Analysis and Machine Intelligence 23(10): 1165-1174, Dec. 2001.

Turk, A. and A. Pentland. (1991). "Eigenfaces for Recognition", Journal of Cognitive Neuroscience 3 (1): 71-86.

\* cited by examiner

Fig. 1

ADAPTIVE MULTI-MODAL INTEGRATED BIOMETRIC IDENTIFICATION AND SURVEILLANCE SYSTEMS

CROSS REFERENCE TO RELATED APPLICATIONS

This application is a divisional application and claims priority to and the benefit of the filing date of U.S. continuation patent application Ser. No. 13/738,655, filed Jan. 10, 2013, and entitled "Adaptive Multi-Modal Integrated Biometric Identification Detection and Surveillance Systems," which is a continuation patent application of Ser. No. 13/101,149, filed May 5, 2011, now U.S. Pat. No. 8,373,753, and entitled "Adaptive Multi-Modal Integrated Biometric Identification Detection and Surveillance Systems", which is a divisional patent application of U.S. patent application Ser. No. 11/231,353 filed on Sep. 19, 2005, now U.S. Pat. No. 7,956,890 and entitled "Adaptive Multi-Modal Integrated Biometric Identification Detection and Surveillance Systems" which claims the benefit of U.S. Provisional Application No. 60/610,998, filed on Sep. 17, 2004, and entitled "Adaptive Multi-Modal Integrated Biometric Identification Detection Systems," all of which are hereby incorporated by reference in their entirety as if fully set forth herein.

BACKGROUND OF THE INVENTION

1. Field of the Invention

The invention relates in general to biometric identification, and more particularly, to a surveillance system using biometric identification.

2. Brief Description of the Related Art

The state of the art of applying biometric technologies to authenticate and positively determine the identity of a person is still faced with several technical challenges. Specifically, the challenges can be categories into two aspects: data acquisition and data matching. Data acquisition deals with acquiring biometric data from individuals. Data matching deals with matching biometric data both quickly and accurately. These challenges can be explained by a port-entry scenario. In such a setting, it is difficult to obtain certain biometric data such as DNA and voice samples of individuals. For biometric data that can be more easily acquired, such as face images and fingerprints, the acquired data quality can vary greatly depending on acquisition devices, environmental factors (e.g., lighting condition), and individual corporation. Tradeoffs exist between intrusiveness of data collection, data collection speed, and data quality.

Once after the needed data have been acquired, conducting matching in a very large database can be very time-consuming. It goes without saying that unless a system can acquire and match data both timely and accurately, the system is practically useless in improving public security, where the inconvenience due to the intrusive data-acquisition process and the time-consuming matching process ought to be minimized.

A biometric system typically aims to address either one of the following issues: 1) Authentication: is the person the one he/she claims to be? 2) Recognition: who a person is? In the first case, data acquisition is voluntary and matching is done in a one-to-one fashion—matching the acquired data with the data stored on an ID card or in a database. In the second case, individuals may not be cooperating, and the system must conduct searches in a very large repository.

The prior art in biometric can be discussed in two parts: single-modal solutions and multi-modal solutions. Several systems have been built to use one of the following single modal: facial data, voice, fingerprint, iris or DNA. The effectiveness of these single-modal approaches can be evaluated in three metrics: the degree of intrusiveness, speed and accuracy. From the perspective of a user, acquiring face modal can be the most noninvasive method, when video cameras are mounted in the distance. However, the same convenience nature often compromises data quality. An intrusive face acquisition method is to acquire frontal face features, which requires corporation from individuals. Voice is another popular modal. However, traditional voice-recognition fails miserable when voice samples of multiple individuals are simultaneously captured or when background noise exists. Even when the acquired voice data can be "pure," existing signal processing and matching techniques can hardly achieve recognition accuracy of more than 50%. The next popular modal is fingerprint, which can achieve much higher recognition accuracy at the expense of intrusive data acquisition and time-consuming data matching. Finally, DNA is by far the most accurate recognition technique, and the accompanying inconvenience in data acquisition and the computational complexity are both exceedingly high. Summarizing the single model approach, non-intrusive data-acquisition techniques tend to suffer from low recognition accuracy, and intrusive data-acquisition techniques tend to suffer from long computational time As to multimodal techniques, there have been several prior art United States patents and patent applications disclose techniques. However, as will be further discussed below, these disclosures do not provide scalable means to deal with tradeoffs between non-intrusiveness, speed and accuracy requirements. These disclosures may fix their system configuration for a particular application, and cannot adapt to queries of different requirements and of different applications.

Wood et al. disclose in U.S. Pat. No. 6,609,198 a security architecture using the information provided in a single sign-on in multiple information resources. Instead of using a single authentication scheme for all information resources, the security architecture associates trust-level requirements with information resources. Authentication schemes (e.g., those based on passwords, certificates, biometric techniques, smart cards, etc.) are employed depending on the trust-level requirement(s) of an information resource (or information resources) to be accessed. Once credentials have been obtained for an entity and the entity has been authenticated to a given trust level, access is granted, without the need for further credentials and authentication, to information resources for which the authenticated trust level is sufficient. The security architecture also allows upgrade of credentials for a given session. The credential levels and upgrade scheme may be useful for a log-on session; however, such architecture and method of operations do not provide a resolution for high speed and high accuracy applications such as passenger security check in an airport.

Sullivan et al. disclose in U.S. Pat. No. 6,591,224 a method and apparatus for providing a standardized measure of accuracy of each biometric device in a biometric identity authentication system having multiple users. A statistical database includes continually updated values of false acceptance rate and false rejection rate for each combination of user, biometric device and biometric device comparison score. False acceptance rate data are accumulated each time a user successfully accesses the system, by comparing the user's currently obtained biometric data with stored templates of all other users of the same device. Each user is treated as an "impostor" with respect to the other users, and the probability of an impostor's obtaining each possible comparison score is computed with accumulated data each time a successful access is made to the system. The statistical database also contains a false rejection rate, accumulated during a test phase, for each combination of user, biometric device and biometric device comparison score. By utilizing a biometric score normalizer, Sullivan's method and apparatus may be useful for improving the accuracy of a biometric device through acquiring more training data.

Murakami et al. disclose in U.S. Pre-Grant Publication 2002-0138768 entitled "Method for biometric authentication through layering biometric traits," a portable biometric authentication system having a single technology for measuring multiple, varied biological traits to provide individual authentication based on a combination of biological traits. At least one of these biometric traits is a live physiological trait, such as a heartbeat waveform, that is substantially— but not necessarily completely unique to the population of individuals. Preferably, at least one of the identifying aspects of the biological traits is derived from a measurement taken by reflecting light off the subdermal layers of skin tissue. The Murakami et al. approach is limited by the more intrusive measurement techniques to obtain data such as heartbeat waveform and reflecting light off the subdermal layers of skin tissue. These data are not immediately available in a typical security check situation to compare with the biometric data, e.g., heart beat waveforms and reflection light from subdermal layers from the skin of a targeted searching object. Furthermore, the determination or the filtering of persons' identity may be too time consuming and neither appropriate for nor adaptive to real time applications.

Langley discloses in U.S. Pre-Grant Publication 2002-0126881, entitled "Method and system for identity verification using multiple simultaneously scanned biometric images," a method to improve accuracy and speed of biometric identity verification process by use of multiple simultaneous scans of biometric features of a user, such as multiple fingerprints, using multiple scanners of smaller size than would be needed to accommodate all of the fingerprints in a single scanner, and using multiple parallel processors, or a single higher speed processor, to process the fingerprint data more efficiently. Obtaining biometric data from multiple user features by use of multiple scanners increases verification accuracy, but without the higher cost and slower processing speed that would be incurred if a single large scanner were to be used for improved accuracy. The methods according to Langley may provide the advantages of speed and accuracy improvements. However, the nature of requiring multiple scans makes data acquisition time-consuming and intrusive.

On the academia side, much research effort has been geared toward analyzing data from individual biometric channels (e.g., voice, face, fingerprint, please see the reference list for a partial list), less emphasis has been placed on comparing the performance of different approaches or combing information from multiple biometric channels to improve identification. Some notable exceptions are discussed below. In Hong Lin, Jain A. K., Integrating faces and fingerprints for personal identification, IEEE Transactions on Pattern Analysis and Machine Intelligence, Vol. 20, No. 12, December 1998, pp. 1295-1307, the authors report an automated person identification system that combines face and fingerprint information. The face recognition method employed is the traditional eigen face approach, M. Turk and A. Pentland, Eigenfaces for Recognition, J. Cognitive Neuroscience Vol. 3, No. 1, 1991, pp. 71-96, which computes a set of orthonormal bases (eigen faces) of the database images using the principal component analysis. Face images are then approximated by their projection onto the orthonormal Eigen face bases, and compared using Euclidean distances. For fingerprint, the authors extend their previous work, Jain, A. K.; Lin Hong; Bolle, R.; On-line fingerprint verification, Pattern Analysis and Machine Intelligence, Vol. 19, No. 4, April 1997, pp. 302-314, to extract minutiaes from fingerprint images. They then align two fingerprint images by computing the transformation (translation and rotation) between them. Minutiaes are strung together into a string representation and a dynamic programming-based algorithm is used to compute the minimum edit distance between the two input fingerprint strings. Decision fusion is achieved by cross validation of the top matches identified by the two modules, with matching results weighed by their confidence or accuracy levels. The performance of the system is validated on a database of about 640 face and 640 fingerprint images.

In Phillips, Henson Moon; Rive, S E A.; Russ, The FERRET evaluation methodology for face-recognition algorithms, IEEE Transactions on Pattern Analysis and Machine Intelligence, Vol. 22, No. 10, October 2000, pp. 1090-1104, the Michigan State University research group extends their information fusion framework to include more modalities. In particular, images of a subject's right hand were captured, and fourteen features comprising the lengths of the fingers, widths of the fingers, and widths of the palm at various locations of the hand. Euclidean distance metric was used to compare feature vectors. Simple sum rules, decision tree and linear discriminant function are used for classification. It is observed that a personal ID system using three modules outperforms that uses only two of the three modules. While this is an interesting experiment, the data set used is small and there is no accepted universal standard in using hand images in biometrics.

In R. Brunelli, D. Falavigna, T. Poggio and L. Stringa, Automatic Person Recognition by Using Acoustic and Geometric Features, Machine Vision and Applications 1995, Vol. 8 pp. 317-325, an automated person recognition system using voice and face signatures is presented. The speaker recognition subsystem utilizes acoustic parameters (log-energy outputs and their first-order time derivatives from 24 triangular band-pass filters) computed from the spectrum of short-time windows of the speech signal. The face recognition subsystem is based on geometric data represented by a vector describing discriminant facial features such as positions and widths of the nose and mouth, chin shape, thickness and shape of the eyebrows, etc. The system captures static images of the test subjects and the test subjects are also asked to utter ten digits from zero to nine for use in the speaker ID subsystem. Each subsystem then computes the distances of the test subject's speech and face signatures with those stored in the databases. Decisions from the two ID modules are combined by computing a joint matching score that is the sum of the two individual matching scores, weighted by the corresponding variance. Experimental results show that integration of visual and acoustic information enhances both performance and reliability of the separate systems. The above system was later improved upon in Brunelli, R.; Falavigna, D., Person identification using multiple cues, IEEE Transactions on Pattern Analysis and Machine Intelligence, Vol. 17, No. 10, October 1995, pp. 955-966, where multiple classifiers are used in the face recognition subsystems, and the matching score normalization process is made more robust using robust statistical methods.

In Kittler, J.; Hatef, M.; Duin, R. P. W.; Matas, J., On combining classifiers, IEEE Transactions on Pattern Analysis and Machine Intelligence, Vol. 20, No. 3, March 1998, pp. 226-239, a performance study of various ensemble classification scheme is presented. It is shown that many existing decision aggregation rules are actually simplifications based on the more general Bayesian rule. The authors compare the performance of different decision aggregation rules (max, min, median, and majority voting rule) by performing an experiment in biometrics. Three modules are used: frontal faces, face profiles, and voiceprints. Simple correlation-based and distance-based matching is performed on frontal faces and face profiles, respectively, by finding a geometric transformation that minimizes the differences in intensity. It is shown that a simple aggregation scheme by summing the results from individual classifiers actually perform the best.

In Lu X; Wang Y; and Jain A, Combing classifiers for face recognition, IEEE International Conference on Multimedia Systems and Expo, Baltimore, Md., July 2003, three well-known appearance-based face recognition methods, namely PCA, M. Turk and A. Pentland, Eigenfaces for Recognition, J. Cognitive Neuroscience Vol. 3, No. 1, 1991, pp. 71-96, ICA, and LDA, Belhumeur, P. N.; Hespanha, J. P.; Kriegman, D. J., Eigenfaces vs. Fisherfaces: recognition using class specific linear projection, IEEE Transactions on Pattern Analysis and Machine Intelligence, Vol. 19, No. 7, July 1997, pp. 711-720, are used for face image classification. Two combination strategies, the sum rule and RBF network, are used to integrate the outputs from these methods. Experimental results show that while individual methods achieve recognition rates between 80% and 88%, the ensemble classifier boosts the performance to 90%, using either the sum rule or RBF network. In Senior, A., A combination fingerprint classifier, IEEE Transactions on Pattern Analysis and Machine Intelligence, Vol. 23, No. 10, October 2001, pp. 1165-1174, a similar multi-classifier scheme, this time for fingerprint classification, is proposed. Hidden Markov Models and decision trees are used to recognize ridge structures of the fingerprint. The accuracy of the combination classifier is shown to be higher than that of two state-of-the-art systems tested under the same condition. These studies represent encouraging results that validate our multi-modal approach, though only a single biometric channel, either face or fingerprint, not a combination of biometric channels, is used in these studies.

Maio, D.; Maltoni, D.; Cappelli, R.; Wayman, J. L.; Jain, A. K., FVC2000: fingerprint verification competition, IEEE Transactions on Pattern Analysis and Machine Intelligence, Vol. 24, No. 3, March 2002, pp. 402-412, documents a fingerprint verification competition that was carried out in conjunction with the International Conference on Pattern Recognition (ICPR) in 2000 (a similar contest was held again in 2002). The aim is to take the first step towards the establishment of a common basis to better understand the state-of-the-art and what can be expected from the fingerprint technology in the future. Over ten participants, including entries from both academia and industry, took part. Four different databases, two created with optical sensors, one with a capacitive sensor, and one synthesized, were used in the validation. Both the enrollment error (if a training image can be ingested into the database or not) and the matching error (if a test image can be assigned the correct label or not) and the average time of enrollment and matching are documented.

A study, that is similar in spirit but compares the performance of face recognition algorithms, is reported in Phillips, P. J.; Hyeonjoon Moon; Rizvi, S. A.; Rauss, P. J., The FERET evaluation methodology for face-recognition algorithms, IEEE Transactions on Pattern Analysis and Machine Intelligence, Vol. 22, No. 10, October 2000, pp. 1090-1104. A subset of the Feret database (a gallery of over 3000 images) was used in the study. Ten different algorithms, using a wide variety of techniques, such as PCA and Fischer discriminant, were tested. Cumulative matching scores as a function of matching ranks in the database are tabulated and used to compare the performance of different algorithms. This study was repeated three times, in August 1994, March 1995, and July 1996. What is significant about this study is that the performance of the face recognition algorithms improved over the three tests, while the test condition became more challenging (with increasingly more images in the test datasets).

As can be seen from the above brief survey, multi-modal biometrics holds a lot of promise. It is likely that much more accurate classification results can be obtained by intelligently fusing the results from multiple biometric channels given performance requirements. While it is important to keep on improving the accuracy and applicability of individual biometric sensors and recognizers, the performance of a biometric system can be boosted significantly by judiciously and intelligently employing and combining multiple biometric channels.

While there have seen significant research activities in single- and multi-channel biometry over the past decade, the state-of-the-art is still wanting in terms of speed and accuracy. Therefore, a need still exists in the art to provide new and improved methods and system configurations to increase the speed and accuracy of biometric identity verification and determinations such that the above-mentioned difficulties and limitations may be resolved. The present invention meets this need.

SUMMARY

One embodiment of the invention provides a novel surveillance method. An event sensor such as, a camera, chemical sensor, motion detector, unauthorized door access sensor, for example, is disposed to sense an occurrence of a potential security breach event. A camera with a view of the area in which an event is sensed gathers biometric information concerning a subject person in the vicinity of the event at about the time the event is sensed. A subject dossier is produced containing biometric information relating to the subject person sensed by the camera with the view of the area. Biometric information of persons captured on one or more other surveillance cameras in the general vicinity of the event is matched against corresponding biometric information in the subject dossier.

Another embodiment of the invention provides a new surveillance system. A sensor is disposed in a surveillance region to sense an occurrence of a security breach event. The system includes a plurality of cameras. At least one camera of the plurality has a view of the security area and can be configured to automatically gather biometric information concerning a subject person in the vicinity of an area where the event occurred in response to the sensing of the event. One or more of the plurality of cameras can be configured to search for the subject person. The surveillance system also includes a processing system which can be programmed to produce a subject dossier corresponding to the subject person. The processing system also can be programmed to match biometric information of one or more persons captured by one or more of the cameras with corresponding biometric information in the subject dossier.

These and other features and advantages of the invention sill be apparent from the following description of embodiments thereof in conjunction with the drawings.

BRIEF DESCRIPTION OF THE DRAWINGS

FIG. 1 is an illustrative showing a map of an airport passenger terminal and its immediate vicinity protected by a surveillance system of one embodiment of the invention and also showing several pop-up views relating to event alerts in accordance With the embodiment.

DETAILED DESCRIPTION OF THE INVENTION

Figure 2:
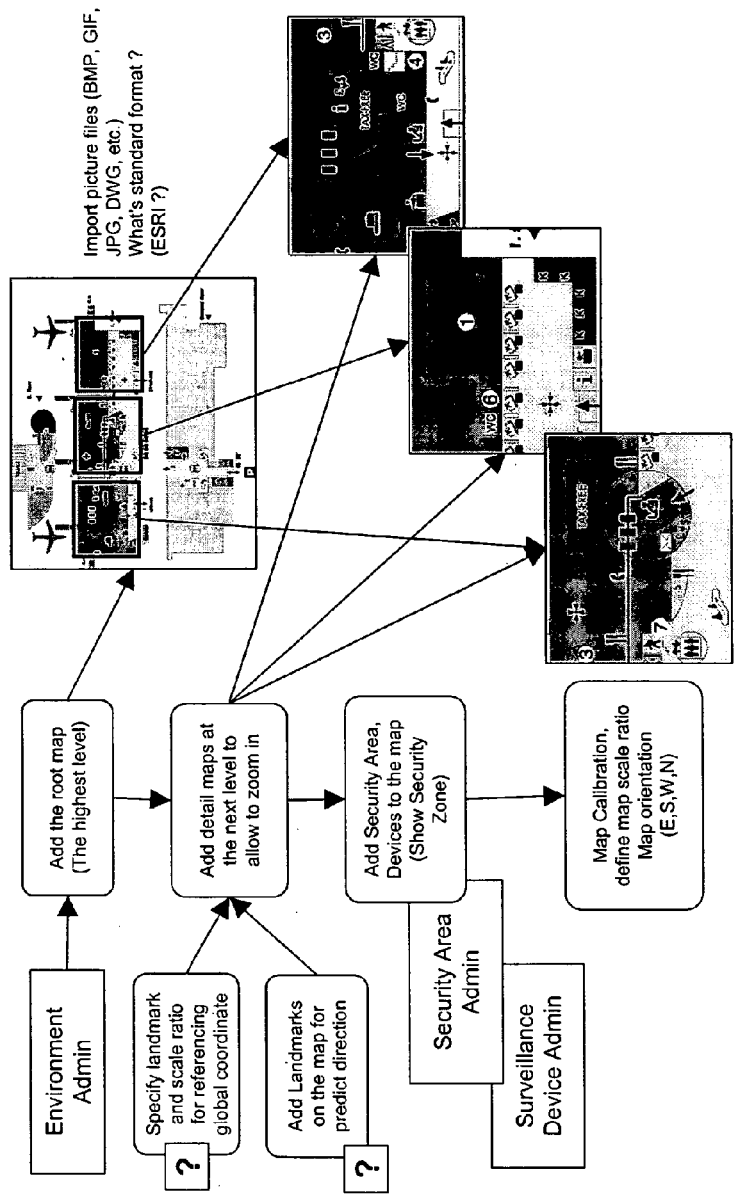
FIG. 2 is another view of the map of FIG. 1 showing zoom to detail maps of different portions of the overall passenger terminal map.

The following description is presented to enable any person skilled in the art to make and use the invention, and is provided in the context of particular applications and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention can be practiced without the use of those specific details. In other instances, well-known structures and devices are shown in block diagram from in order not, to obscure the description of the invention with unnecessary detail. Thus, the present invention is not intended to be limited to the embodiments shown, but is to be accorded the widest scope consistent with the principles and features disclosed herein.

System Overview

One embodiment of the invention involves an intelligent surveillance system. A plurality of cameras, some with and some without overlapping fields of view, are distributed throughout a surveillance region. Intelligent computer software based agents process information captured by one or more of the cameras to produce a subject dossier indicative of the identity of a person whose images have been captured by one or more of the cameras. Information for a subject dossier also may be gathered through other modalities such as voice recognition, iris scan, or fingerprint, for example. The system includes multiple event sensors, which may include the cameras, chemical sensors, infrared sensors, or other security alarm sensors that trigger an alert, upon sensing an occurrence of a predetermined category of event requiring heightened vigilance. For example, an alarm may be triggered when a locked door is opened without proper access permission or when an unauthorized person enters a restricted area or when a vehicle is parked in a restricted area. More specifically, a subject dossier is produced for individuals in the vicinity of the location of an alarm-triggering event. For instance, a subject dossier may be produced for persons captured in a video camera image at or near a door in the surveillance region at about the time when an unauthorized opening of the door is detected by an event sensor.

A subject dossier may include soft biometric information, also referred to as "soft" features such as clothing color, estimated height and weight. A subject dossier also may include temporal information, such as walking speed or direction of travel. In addition, a subject dossier also may include more permanent information such as facial features, fingerprint, iris scan, voiceprint and DNA. Soft features may be selected to be especially useful for relocating an individual within the surveillance region, especially in a crowd, for example. For instance, it may be relatively easy to identify individuals based upon clothing color or estimated height and weight. However, soft features have the disadvantage of not being as reliable or permanent over time. If a person takes off his jacket, then an identifying color feature may be lost. If a person sits down, then it may become impossible to use height and weight information to pick that person out of a crowd.

System sensors continually monitor the surveillance region for the occurrence of one or more suspicious events. In one embodiment, the system directs a live video feed from one or more cameras having the location of an alert-triggering event in their field of view to a console in a manned control center. The system also may direct video images captured just before the event to the control center console. Thus, an operator at the console can observe behavior of suspicious individuals at the scene of the event in real time and immediately prior to the event. A subject dossier produced for individuals at the scene of the event can be used to automatically identify and track a suspect individual present at the scene of the event within the surveillance area after the occurrence of the event.

The system may employ information in a subject dossier incrementally. For instance, the system may prioritize information in the subject dossier. Certain information in the subject dossier such as clothing color, estimated height and weight, walking pattern or gait and certain key facial features such as facial shape, facial hair, skin color, or hair color may be used to make an initial estimate of which persons in a camera's field of view are candidates for a match to a suspicious person identified in response to an alert. Other features from a subject dossier then may be added incrementally to make a more careful assessment of whether identified candidates actually match the suspect. Alternatively, as more information concerning a suspicious person becomes available, additional features may be added incrementally to a suspect's subject dossier for that person. This additional information then may be used to more effectively locate and track the individual within the surveillance region.

Surveillance Region

Figure 1:
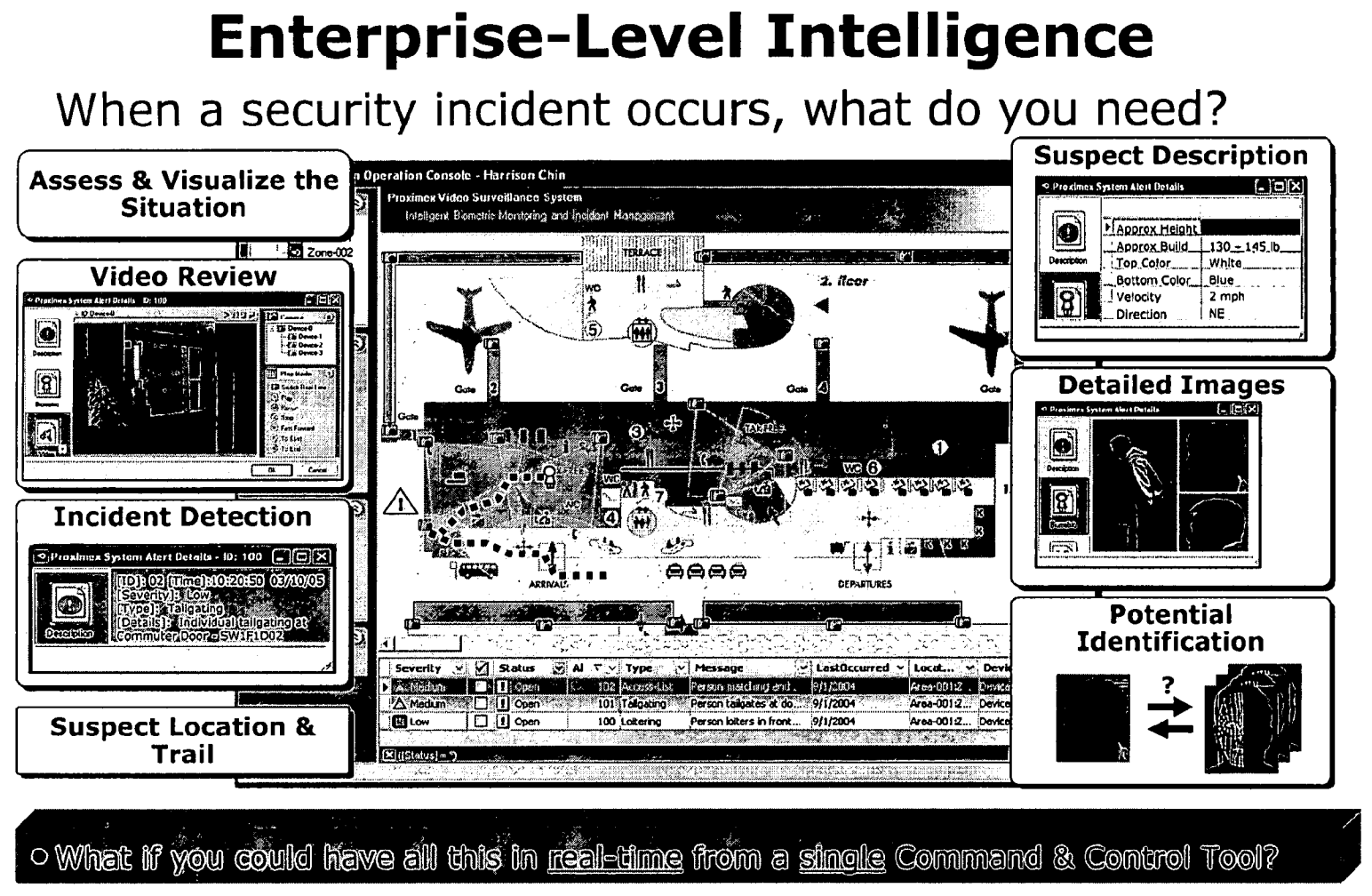

One embodiment of the invention is configured for use in airport security. In this embodiment, the surveillance region comprises an airport passenger terminal and the surrounding passenger ground transport loading/unloading zone directly outside the terminal and the aircraft parking area adjacent the terminal. FIG. 1 is an illustrative drawing of a map of an airport passenger terminal and its immediate vicinity protected by a surveillance system of one embodiment of the invention. The system includes multiple cameras, each with an associated field of view, some of which are overlapping. The surveillance region has multiple areas including passenger arrival and departure areas, a passenger departure shops and a terrace. Groups of cameras with overlapping fields of view are deployed to capture images within different regions of the passenger arrival and passenger departure areas.

FIG. 2 is another view of the map of FIG. 1 showing zoom to detail maps of different portions of the overall passenger terminal map. The illustrative maps of FIGS. 1-2 can be displayed on a control terminal so that an operator can easily correlate an alert to a specific area an airport surveillance region. For instance, if an alert is triggered in the arrivals region shown in FIG. 1, then an operator may request the left-most zoom shown in FIG. 2 in order to quickly picture the airport layout in the vicinity of the alert. Additional zoom maps (not shown) may be provided for numerous locations such as security gates, check-in counters, airport fairway, parking area, access entrance, check-in counters, etc. Each different area may be associated with a group of cameras and event sensors.

Figure 3:
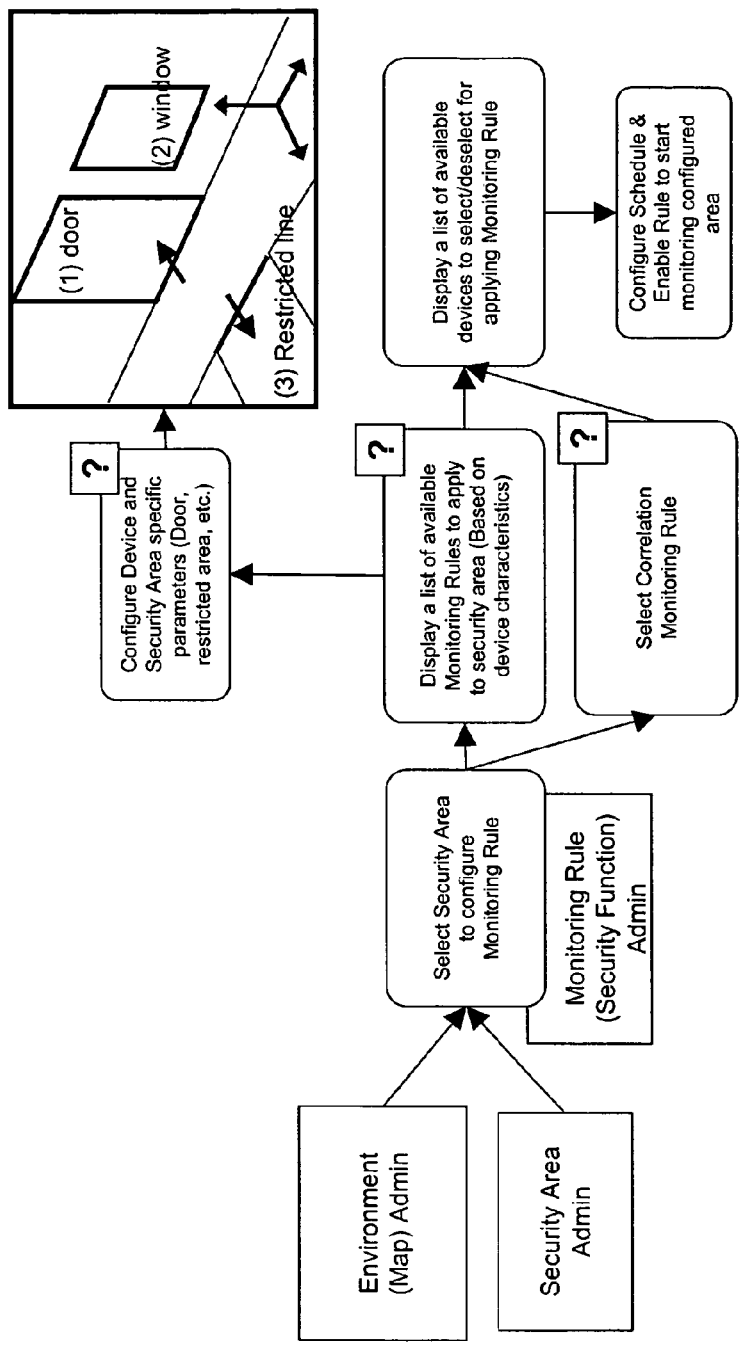
FIG. 3 is an illustrative drawing of example security areas within the surveillance region of FIGS. 1-2 outfitted with event sensors.

Event sensors are disposed at selected locations within the surveillance region. FIG. 3 is an illustrative drawing of example security areas within the surveillance region of FIGS. 1-2 outfitted with event sensors. A first security area comprises a door. The door may be equipped with a sensor, such as a mechanical sensor, that detects unauthorized opening of the door. A second security area comprises a window. The window may be associated with a mechanical sensor that detects when the window has been broken. A third security represents a threshold to a restricted area. The restricted area may be equipped with motion detectors that detect the presence of persons in a restricted area. Cameras situated throughout the surveillance region also may serve as event sensors. For example, the system may employ a monitoring rule whereby a camera monitors a particular area of the passenger terminal. If a person is loitering in that area, defined by failing to move beyond a 15 foot radius for more than 60 seconds, then a low level alert is declared, the camera zooms in, and the face of the loitering person is matched against the faces of persons on a watch list, for example.

Landmarks are defined in the security areas for purpose of estimating height and weight and direction and speed of travel of a suspect individual. For instance, a landmark such as a countertop may be identified, and processing of a camera image may be calibrated to estimate a person's height relative to the land marked countertop. A group of multiple structures, such as telephone booths, lounge areas, signs or countertops, within a field of view of one or more of a group of cameras covering a security area may be identified. Processing of camera images from the group of cameras may be used to estimate the direction and speed at which a suspect is moving based upon the sequence and timing of his passing the land marked structures.

Although the surveillance region in this one example is described in terms of an airport passenger terminal, it will be appreciated that the invention is not restricted to an airport terminal. Moreover, the surveillance region need not be a continuous local area. Event sensors and surveillance cameras may be disposed over disparate areas and be in communication with a control center via a network such as the internet, for example.

System Architecture

Figure 4:
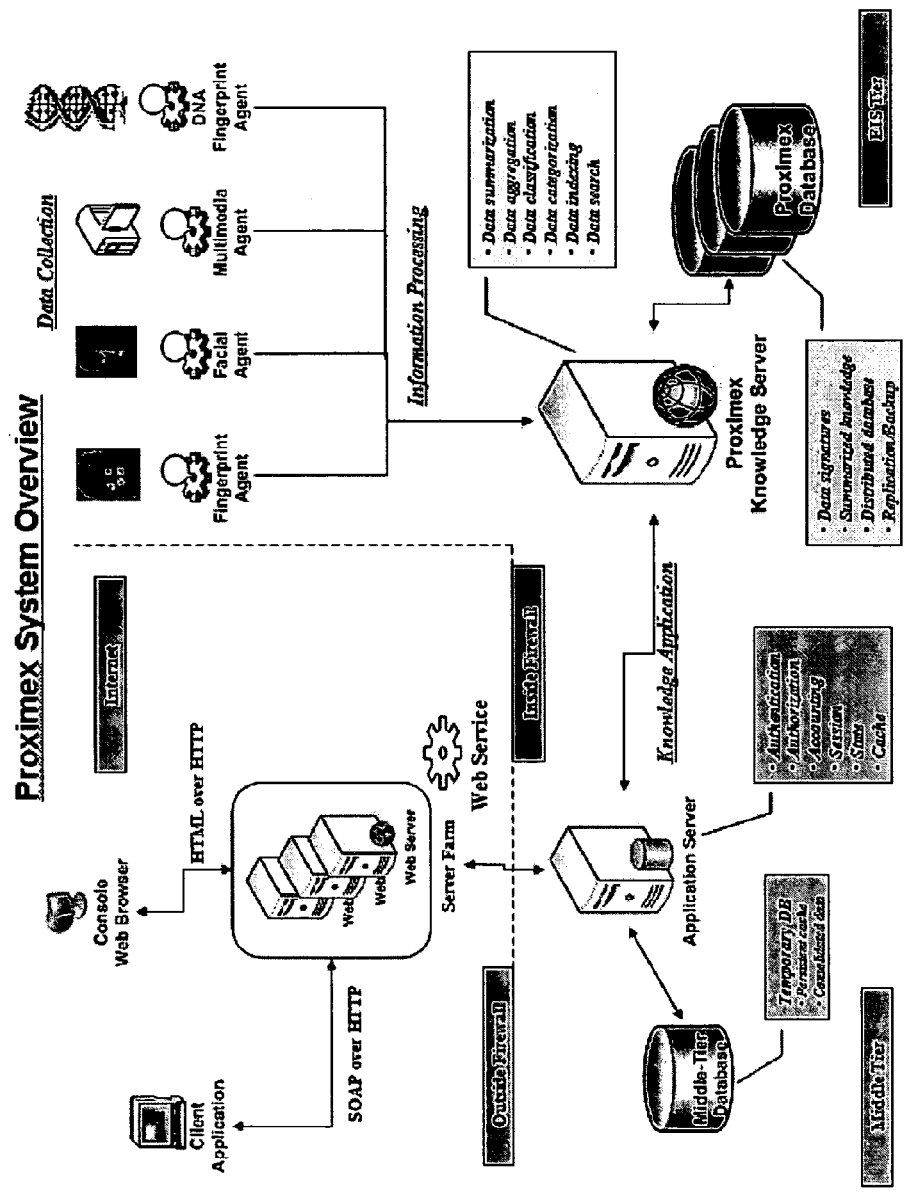
FIG. 4 is an illustrative block level hardware diagram of a surveillance system in accordance with an embodiment of the invention.

FIG. 4 is an illustrative block level hardware diagram of a surveillance system in accordance with an embodiment of the invention. The system includes multiple data collection agents, a knowledge server, a local knowledge server database, an application server, a middle-tier database, web servers, a browser based control console and one or more client applications such as Computer Aided Dispatch system, building management system, access control system, etc. It should be understood that the various components shown are merely illustrative. Each agent may gather information from numerous sources, such as the cameras shown in FIG. 1, distributed throughout a surveillance region. Moreover, for example, the knowledge server and the application server can be implemented across multiple hardware systems or as different processes within a single hardware system.

A security agent is a process that spans many tasks to collect information about subject(s). For example, a security agent may spawn multiple data collection agents include a facial features, fingerprint, DNA, clothing color, subject gait, subject height and weight, skin color/tone, hair color/tone, subject direction and voiceprint, for example. Each data collection task produces different information about an individual. More specifically, each produces a signature indicative of some identifying aspect of a person under surveillance. For instance, a facial features agent uses facial information captured by one or more cameras to produce a signature indicative of an individual's facial features. Similarly, for example, a clothing color agent uses clothing color information captured by one or more cameras to produce a signature indicative of the color of an individual's clothing color. Thus, the multiple agents can produce multiple different signatures, each indicative of one or more different identifying feature of an individual.

The agents provide the signatures to the knowledge server, which aggregates signatures for each given person under surveillance into a subject dossier for that person. The knowledge server indexes the signatures within a given subject dossier to permit incremental searches for individuals within the search region. The knowledge server also may perform classification and matching. The local knowledge server database stores the digital signatures and corresponding indexing information.

The web services is the component that provides the interfaces via Web Server which is usually part of an operating system. For example, web services provides the interfaces for our internal components or external systems via Web Server (such as Microsoft IIS on Windows, or Apache on Linux). All the interfaces to the system are via HTTP or HTTPS using port 80. Doing so, our system can run across firewall. Basically, the Web Services component just exposes our system interface to the outside world via Web Server.

The application server is the component that provides that database access to the user interface component, and performs session management which includes authentication and authorization. The middle-tier database serves as the local database for the application server.

Figure 5:
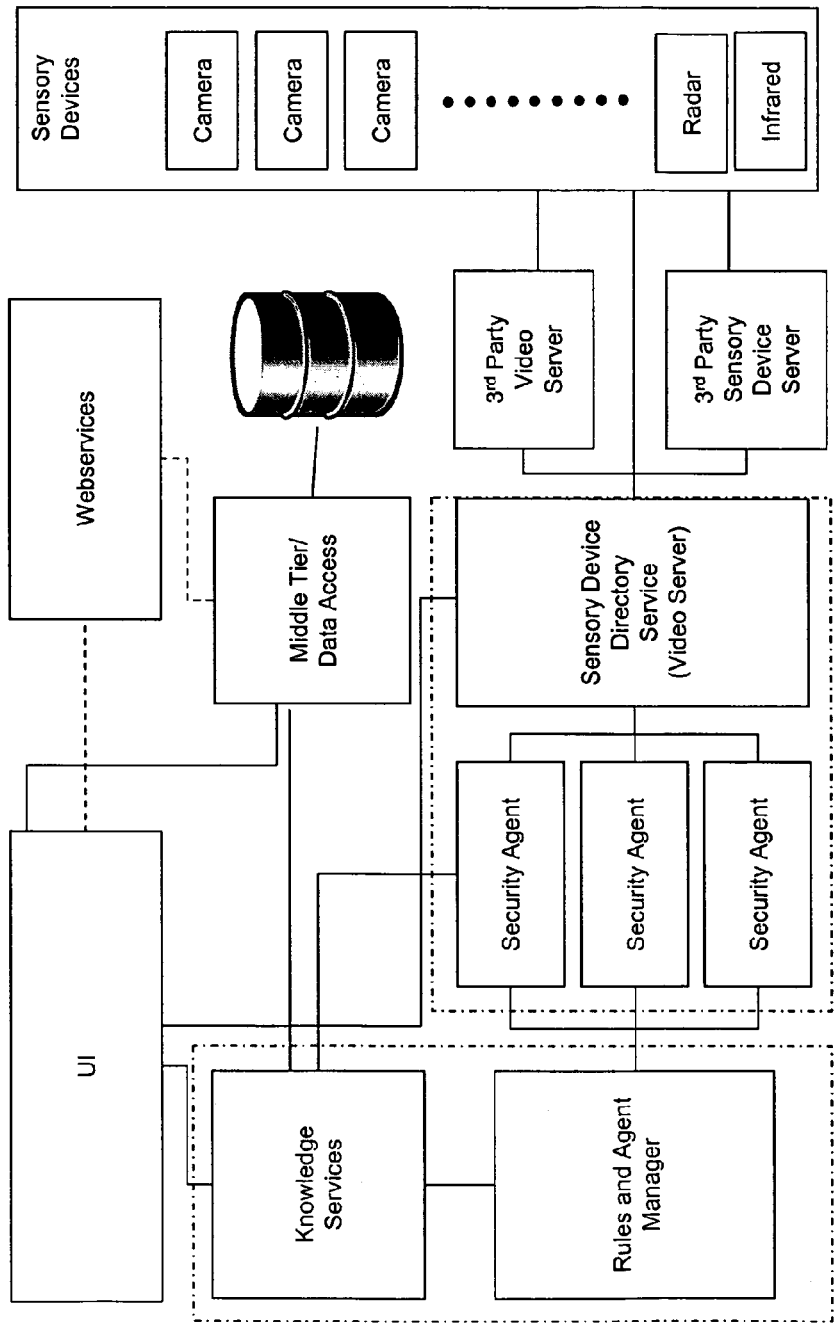
FIG. 5 is an illustrative block diagram level drawing of a system architecture of an embodiment of the invention that incorporates the system hardware of FIG. 4.

FIG. 5 is an illustrative block diagram level drawing of a system architecture of an embodiment of the invention that incorporates the system hardware of FIG. 4. A user interface (UI) provides an operator of the system with real-time information concerning alert events within the surveillance region. The UI may provide maps of the entire surveillance region, including zoom maps. It can display alerts from different sensors including cameras, digital video recorders, access control, bio-chemical detectors, etc. It may display videos of a security area in which an alert has been triggered, detailed images of suspect individuals and details of one or more alerts that have been triggered.

Referring again to FIG. 1, there is show an example of a UI display screen in with pop-up display showing various images relating to one or more alerts. In the center of the screen is map of a surveillance region. The operator can be selectively enlarge, minimize or close each pop-up. A Video Review display provides a video image of the security region at about the time of an alert. An Incident Detection display provides detailed information concerning an alert event. In this example, the alert event involved an individual tailgating at a commuter door. A Suspect Description display provides identifying information concerning an individual under surveillance based upon information gathered into a subject dossier produced for the person. A Detailed Images display provides pictures of a suspect individual captured by one or more surveillance cameras. A Potential Identification display provides images of the suspect together with images of one or more people whose facial features closely match those of the suspect. The potential matches are based upon a facial feature signature provided by the facial feature agent. Across the bottom of the map, there is a chart listing briefly summarizing multiple alert situations. The operator may selectively access pop-up screens for these alert situation.

Thus, the UI advantageously displays a variety of information aggregated in response to one or more alerts. In a typical airport security region, for example, there may be several hundred cameras dispersed throughout a large physical area. Moreover, there may be only a few operators monitoring one or more UI consoles. Depending upon the rules for monitoring and declaring alerts, alerts may occur frequently or infrequently. The UI of one embodiment of the invention directs an operator to areas of a surveillance region that are subject to alert and provides pertinent information concerning the alert so that the operator can efficiently manage security from a control center. The UI also allows an operator to quickly investigate and simultaneously keep abreast of multiple alert events.

Furthermore, as explained more fully below, information from different sensing devices is correlated to facilitate tracking of a suspect within a security region. For instance, soft biometric information and temporal information is used to locate a suspect as he or she travels within the security region. In one embodiment, a dashed line can be produced on a map on the display showing a path followed by a suspect within the surveillance region. Information from different data collection agents may be fused in order to more accurately identify and track an individual. Therefore, the operator can use the UI to evaluate an alert event, to identify and track a suspect. The operator may use this information as a basis to send information to a responder to intercede or deal with an alert incident.

Knowledge Services are implemented as an application running on the knowledge server. Knowledge Services correlate and analyze signature information provided by different sensory devices (i.e., data gathering agents). The Knowledge Services assemble and index subject dossiers, and when appropriate, fuse signature information for improved classification results. The Knowledge Services also generate, activate or deactivate rules and send/control rules and instruction to the Rules and Agent Manager.

The Rules and Agent Manager also is implemented on the knowledge server. The Rules and Agent Manager manages all other agents and manages rules that can be sent to each agent. It correlates information from agents. It can also escalate an alert if the alert is not acknowledged by an operator within a given timeframe and/or similar alerts happen repeatedly within a given time span (e.g. within 2 hours). Both the Knowledge Service and the Rules and Agent Manager are the primary components for aggregating, categorizing biometric signatures which are parts of object dossiers. It also performs other tasks such as task assignment/tracking, load balancing tasks among agents, and interacting with data access components.

The following are examples of rules that may be implemented by the system.

Rules:

| Actor | Action |
| --- | --- |
| Person | Walk through lane against direction of traffic |
| Person | Tailgating |
| Person | Loitering |
| Person | Piggyback |
| Person | Traveler screening |
| Person | Walk in restricted area |
| Vehicle | Park overtime |
| Vehicle | Park in restricted area |

The Person-Loitering rule involves the following criteria:

| | |
| --- | --- |
| Radius | 15 foot |
| Duration | 20 seconds |
| Alert Severity | Low |
| Response | Zoom in face to match "watch list" |

The Person-Tailgating Rule involves the following criteria:

| | |
| --- | --- |
| Alert severity | Critical |
| Response | Acknowledge Loitering and Tailgating alerts and deliver alarm to operator console |

The correlation Monitoring Rule for the occurrence of a Person-Loitering event AND a Person-Tailgating event involving the same person is as follows:

| | |
| --- | --- |
| Alert Severity | Critical |
| Response | Acknowledge Loitering and Tailgating alerts and deliver alarm to operator console |

As described above the UI, may display several categories of information concerning an alert. The Knowledge Service and the Rules and Agent Manager provide the correlation between events and data sources and subject dossiers that permit an operator to view a map of the location of an alert, soft-biometric data of a suspect and video playback, for example. More particularly, these components provide a link to a map and zoom stored in the middle tier database, link to video feeds for video view real-time monitoring or playback of recorded video clips and stored in a Digital Video Recorder system and provide the subject dossier information.

The Middle Tier Data Access runs on the application server. It controls the database including functions such as query, add, delete, index. Indexing biometric signatures and updating subject dossiers are done by this component.

A (Security) Agent is implemented as an application running on the knowledge server that controls and manages the data gathering sensors. In the case of cameras or DVRs, it can also perform video analytic using Computer Vision technology. Those tasks include background subtraction, image stabilization, object detection, object classification, object tracking, and object identification. It can also control the movement of Pan/Tilt/Zoom (PTZ) cameras, manage areas of interest within the field of view of the camera (called Mouse/Man Trap), and collect video streams from DVR or cameras. It also has a scheduler that controls when rules or video analytic are performed.

A Sensory Device Directory Access and Video Server is implemented as an application that has access to the knowledge server manages and provides information regarding sensor devices or other subsystems. Basically, it is a software layer that enables the overall system to handle different makes/models of sensor devices.

The Web Services is the component provided by operating systems or web servers. It manages other components, spawns or deletes services as necessary. It can also listen to messages from other systems. The Web Services provides interfaces to the system via Web Services running as part of a Web Server. The system provides a library resided on a specific directory, and the Web Server (which is usually part of the operating system) will use it to interpret interface requests to our system.

Tracking, Facial Recognition, Fingerprint recognition, and other biometric identification are done at the (Security) agents. Biometric signatures are collected and generated at the agents, and sent to the Rules-and-Agent Manger. The Knowledge Services and the Rule-and-Agent Manager collectively collect biometric signatures and object tracking locations, and then generate and manage subject dossiers. A described above, a subject dossier includes information about object (e.g., person) such as, biometric information/signatures, soft biometric information (hair color, skin tone/color, weight or build, height, etc.) and other temporal information (e.g., speed, direction, location, past activities, information that the operator is looking for, etc.). Data fusion is performed by the Knowledge Services and the Rules and Agent Manager. Data required or generated by each of the components are saved and retrievable via the Middle-tier/Data Access component, which in turn utilizes a relational database such as Microsoft SQL Server.

Subject Dossier

Data gathering agents collect data concerning a subject person from different sources. The Knowledge Services aggregate the data into subject dossier. The data aggregated into a given dossier may include different digital signatures produced by different data gathering agents. A subject dossier also may include fused data signatures produced by the fusion of data gathered from multiple data sources having different data modalities.

The following is an example of information in a subject dossier.

Subject Dossier:

Facial Features Signature (e.g., nose shape and size, face width, distance between eye corners, skin color (light, medium, dark), nose angle (profile view)
Soft Biometrics Signature (e.g., clothing color, height, weight)
Temporal Information Signature (e.g., direction of travel, speed, past places visited/path)
Fingerprint Signature
Voice Print Signature
Iris Scan Signature
DNA Analysis Signature Fingerprint Signature Voice Print Signature Iris Scan Signature DNA Analysis Signature.

The information in a subject dossier is indexed so that it can be used to more efficiently identify and track suspects and to avoid false alarms. More particularly, a dossier is indexed so that certain information such as soft biometrics can be used to screen candidates within a surveillance for closer study and also to predict likely places within a surveillance region to look for a suspect. For instance, soft biometric information such as clothing color, height and weight may be employed to select candidates for further investigation. For example, the Knowledge Services may be programmed to cause the Security Agents to search for a match between clothing color in a subject dossier of a suspect and clothing color of unidentified persons in a surveillance region. If a match is found, then the Knowledge Service may cause the Security Agents to perform an analysis of whether facial features in the subject dossier match facial features of the person with matching color clothing. Moreover, temporal information provided in a subject dossier such as direction and speed of travel of a suspect may trigger the Knowledge Services to alert only certain sensory devices, such as a group of cameras in an area of the surveillance region where the suspect is headed, to be on the lookout for the suspect.

A subject dossier may be incremented as more information concerning a suspect is gathered. For example, initially, only soft biometric information such as clothing color and estimated height and weight might be available. Subsequently, more information such as a facial feature signature or a voice print may become available and will be added to the subject dossier. Newly received data from these multiple sources may be fused with previous data by the Knowledge Services as it is received.

A subject dossier is a record stored in a computer readable medium that can be easily accessed by security agents and a console operator. The dossier is structured to separate soft biometric information and temporal data from other biometric information. Soft biometric and temporal information generally can be characterized as being easier to obtain and useful for tracking purpose, but not very reliable for definitive identification purposes. Other biometric information, such as fingerprints, voiceprints and an iris scan are more reliable, but more difficult to obtain. Thus, soft biometric and temporal data can be used advantageously to track an individual until more reliable information, such as detailed facial features or fingerprints can be obtained to provide a more reliable identification.

Data Gathering Agents

The surveillance system of one embodiment employs multiple streams of data including one or more of, facial features, vocal, fingerprint, iris scan, DNA data, soft biometric data, temporal data and fused data.

Figure 6:
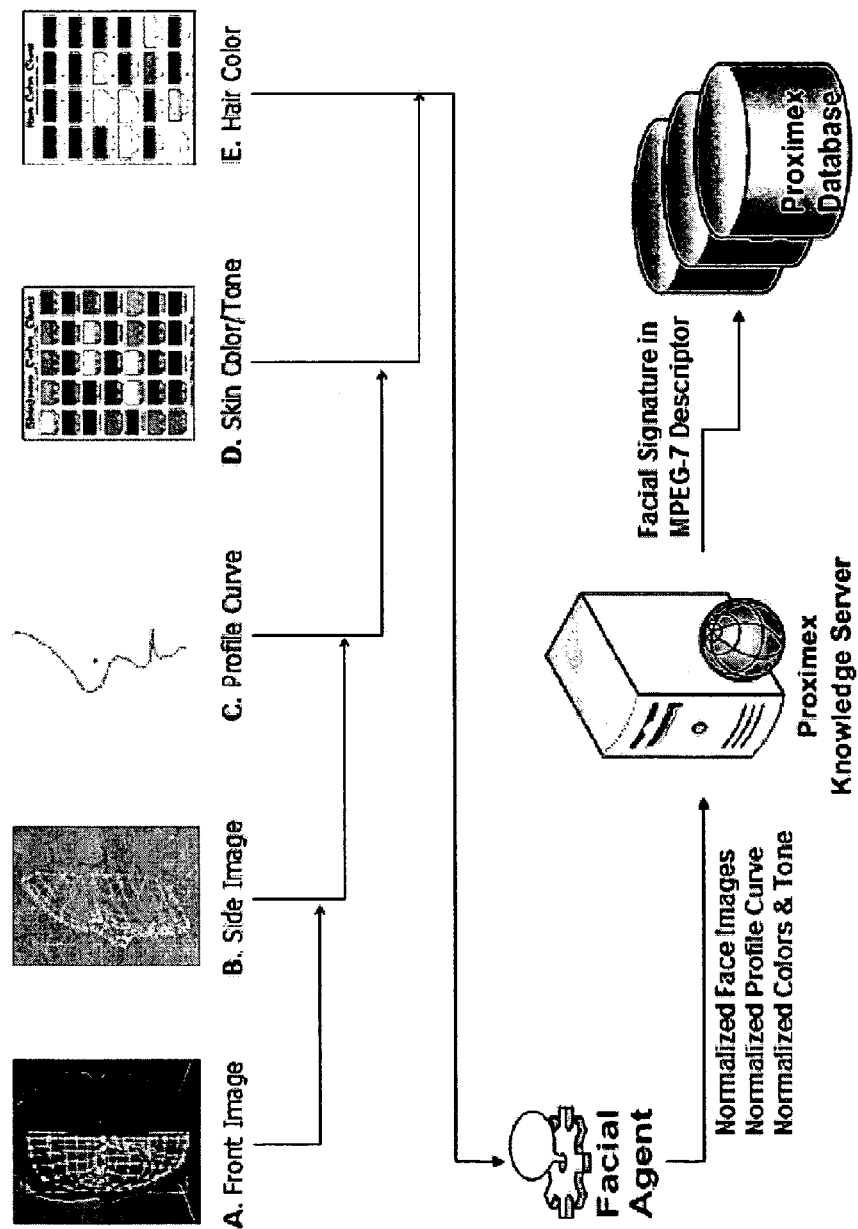
FIG. 6 is an illustrative flow diagram showing gathering and conversion of facial feature data to a facial feature signature.

FIG. 6 is an illustrative flow diagram showing gathering and conversion of facial feature data to a facial feature signature. Facial feature A comprises a front image of a face that is segmented into a plurality of local areas as an irreducible set of image building elements to extract a set of local features that can be mapped into a mathematical formula. Facial feature B comprises is a side image that is also separated into a set of irreducible image building elements for extracting local features. Facial feature C comprises a side profile curve that is also collected for use in the identity check and authentication processes. Facial features D and E comprise skin color and tone and hair color. These facial feature data are collected from several video key frames taken from a parallax camera.

These facial feature data are used to produce a facial features signature. In one embodiment, the Knowledge Services which applies an MPEG-7 descriptor, e.g., a facial recognition descriptor, representing a projection of a face vector onto a set of basis vectors that span the space of possible face vectors and the projection of the face from a side view defined by a profile curve. The face recognition feature sets are extracted from a normalized face image and a normalized profile curve. The normalized face image includes 56 lines with 46 intensity values in each line. The centers of the two eyes in each face image are located on the $24^{th}$ row and the $16^{th}$ and $30^{st}$ column for the right and left eye respectively. This normalized image is then used to extract the one dimensional face vector that includes the luminance pixel values from the normalized face image arranged into a one dimensional vector using a raster scan starting at the top-left corner of the image and finishing at the bottom right corner of the image. The face recognition feature set is then calculated by projecting the one-dimensional face vector onto the space defined by a set of basis vectors. By using the front image, the side image, the profile curve, the skin color and tone and the hair color, the accuracy of identity authentication is significantly improved.

A voiceprint signature also can be produced for identity check and authentication over a telephone, for example. A voiceprint is particularly useful because it is totally noninvasive. In one embodiment, a multi-dimensional voice identification process may be employed to generate a speaker's voice signature by processing pitch contour vectors, time signature, beat number vector and voice shape defined by audio waveforms of the speaker. For example, one embodiment applies pitch models for different pitch intervals, which are defined to be the difference between the semitones of two adjacent nodes:

Pitch Interval=[(log(current pitch)−log(previous pitch)]/log $2^{1/12}$

Figure 7:
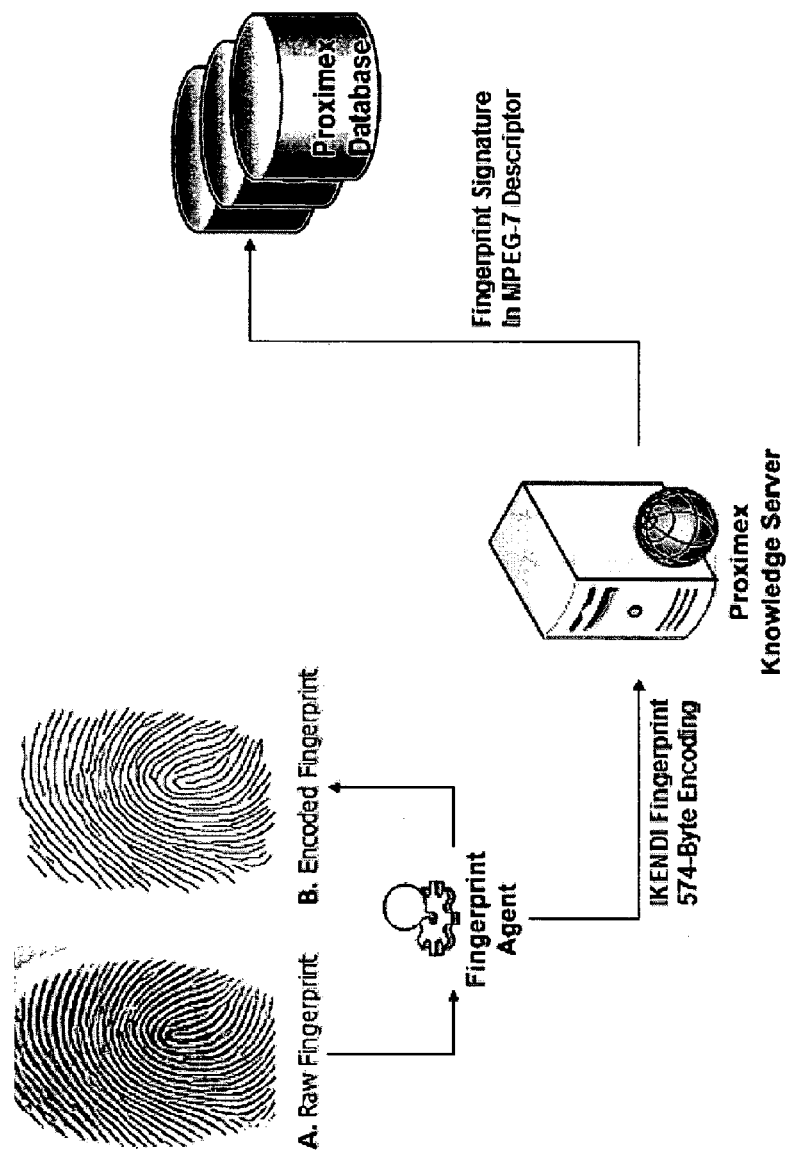
FIG. 7 is an illustrative flow diagram showing gathering and conversion of fingerprint feature data to a fingerprint signature.

FIG. 7 is an illustrative flow diagram showing gathering and conversion of fingerprint feature data to a fingerprint signature. A raw image of a fingerprint is converted into a set of fingerprint codes. The set of codes has a more compact format, e.g., IKENDI Fingerprint Pattern Format, which is based on encoding the friction ridges into a set of direction codes. The coded fingerprint is converted to fingerprint signature in an MPEG-7 descriptor.

Figure 8:
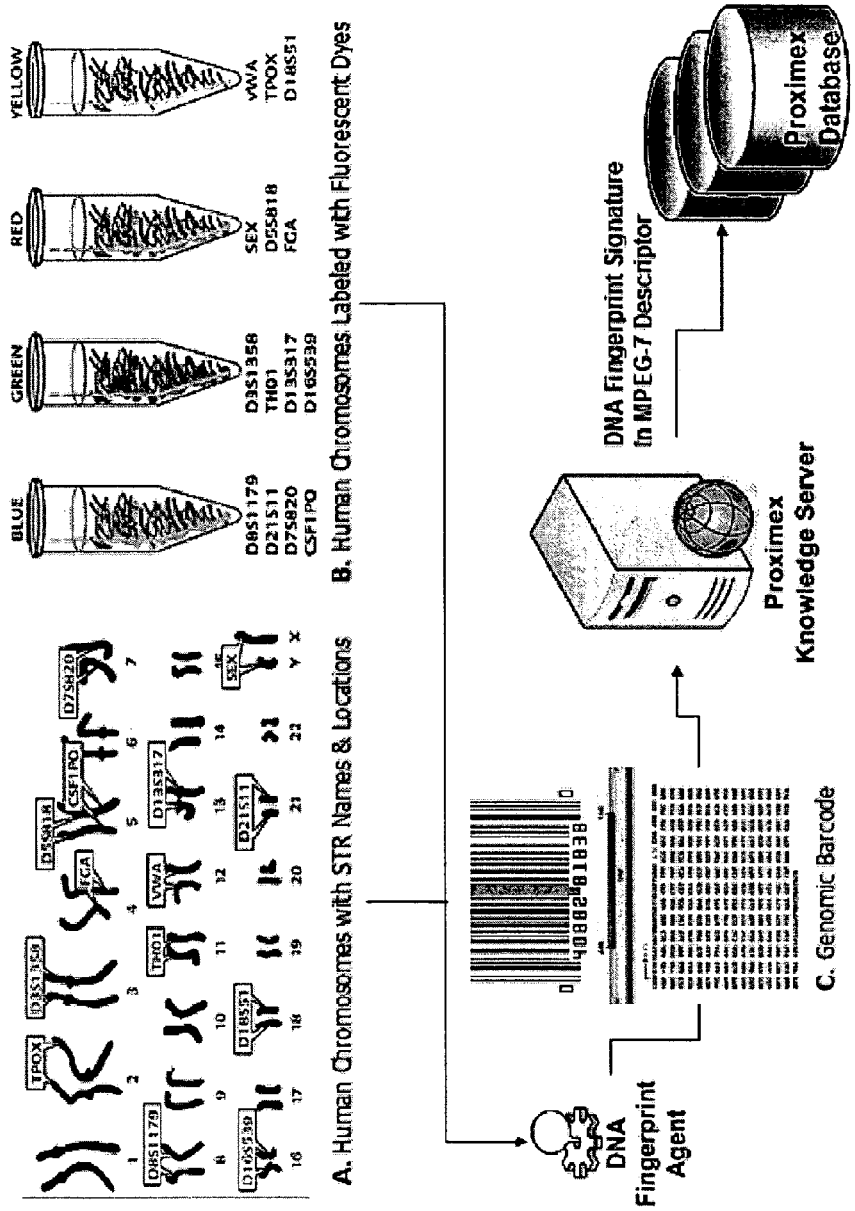
FIG. 8 is an illustrative flow diagram showing gathering and conversion of DNA data to a DNA signature. One embodiment of the invention may employ a DNA fingerprint for identification purposes.

FIG. 8 is an illustrative flow diagram showing gathering and conversion of DNA data to a DNA signature. One embodiment of the invention may employ a DNA fingerprint for identification purposes. A complete DNA profile includes 13 short tandem repeats (STRs) with repeats of four or five nucleotides in addition to a sex marker. Each STR has various expected length and is located on different chromosomes or different ends of the same chromosome and each is independently inherited. FIG. 8 show respectively the human chromosomes with STR names and locations and three or four different polymorphisms labeled with each of four fluorescent dyes. The DNAs of different lengths are separated by gel electrophoresis. Since it is desirable to detect all different DNAs in one signal identification process, different colors of dyes are used to mark different DNAs that have same length. Appropriate dyes are employed in a PCR operation with STR primers to separate the DNAs based on length and color to get accurate DNA fingerprint in a single DNA identification process. The DNA profile signature is generated in the present invention by using STRs and STR types, e.g., {STR Name, Type}, {STR Name, Type} where STR Names are {TPOX, DSS1358, FGA, D5S818, CSF1PO, D7S820, D8S1179, TH01, VWA, D13S317, D16S539, D18S51, D21S11, SEX, etc.} Types are required to make sure other DNA sequences may use the repeat number of alleles instead of hetero/homozygous, e.g., {Heterozygous, Homozygous}. DNA samples for identity check and authentication may include hair, saliva, and blood. Samples are collected and their signatures are stored in a database. New sample can be collected and analyzed (but not in real time) using DNA arrays/chips, GeneChip, Verigene ID, traditional PCR, or Forensic STR Analysis methods. The result signature will be matched with the signatures in the database.

FIG. 8 illustrates genomic barcodes based on a standard Universal Product Codes for identifying retailed products by employing ten alternate numerals at eleven positions to generate one hundred billion unique identifiers. One embodiment of the invention applies the barcode techniques for DNA fingerprint identification process. Special considerations are focused on the facts that the repeat polymorphisms are found mainly in intergenic (nongene) regions of chromosomes, especially near the centromeres and that the polymorphisms always exist in a pair in this case, one from each cop of chromosome 1. At a polymorphic locus (location), different numbers of a repeated unit create different alleles. Furthermore, repeated sequences of 9-80 nucleotides are referred to as Variable Number Tandem Repeats (VNTRs). This VNTR has a 16 nucleotide repeat. Repeated sequences of 2 to 8 nucleotides are referred to as Short Tandem. Repeats (STRs). This STR has four nucleotide repeat. In a general genomic barcode system, huge number of string of sites are generated with four alternate nucleotides, i.e., adenine, guanine, cytosine, thymine, at each position. A survey of just fifteen of these nucleotide positions would create a possibility of $4^{15}$, i.e., one billion codes. In the present invention, only fourteen STRs and types are employed to generate barcodes that are easier to analyze with much smaller amount of data to process and that can be more conveniently searched with existing search engine, e.g., Google search engine.

Soft biometric information, such as clothing color may be captured using cameras calibrated in accordance with a process disclosed in commonly assigned co-pending U.S. patent application Ser. No. Not Yet Known, filed Sep. 16, 2005, entitled "Robust Perceptual Color Identification," invented by K. Gob, E. Y. Chang and Y. F Wang, which is expressly incorporated by reference in its entirety into this application through this reference. This patent application addresses a problem of camera-based sensors perceiving an article of clothing as having a slightly different color when viewed from different angles or under different lighting conditions. The patent application proposes the representing color of an article of clothing using a "robust perceptual color".

Data from different modalities may be fused by the Knowledge Services for classification and identification purposes without suffering the "curse of dimensionality using techniques taught in commonly assigned co-pending U.S. patent application Ser. No. 11/129,090, filed May 13, 2005, entitled, Multimodal High-Dimensional Data Fusion for Classification and Identification, invented by E. Y. Chang, now U.S. Pat. No. 7,242,810 issued Jul. 10, 2007, which is expressly incorporated herein in its entirety by this reference. Data may be incrementally added to a classification and identification process by the Knowledge Services using techniques taught by commonly assigned co-pending U.S. patent application Ser. No. 11/230,932, filed Sep. 19, 2005, entitled Incremental Data Fusion and Decision Making, invented by Yuan-Fang Wang, now U.S. Pat. No. 7,467,116 issued Nov. 25, 2008, which is expressly incorporated herein in its entirety by this reference.

While the invention has been described with reference to various illustrative features, aspects and embodiments, it will be appreciated that the invention is susceptible of various modifications and other embodiments, other than those specifically shown and described. The invention is therefore to be broadly construed as including all such alternative variations, modifications and other embodiments within the spirit and scope as hereinafter claimed.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A surveillance system comprising:
multiple data gathering agents disposed throughout a surveillance region to monitor the surveillance region, the data gathering agents to provide corresponding signatures identifying aspects of a subject person in the surveillance region, the signatures including one or both of biometric information or temporal information;
a database storing a map of a layout for the surveillance region;
a processing system programmed to aggregate the signatures associated with the subject person to produce a subject dossier including one or both of biometric information or temporal information corresponding to the subject person, the processing system programmed to correlate the data gathering agents, the subject dossier and the map; and
a control terminal to display the map of the layout for at least a portion of the surveillance region and produce indicia on the map tracking a path followed by the subject person within the surveillance region, the indicia based on the signatures in the subject dossier and the data gathering agents.

2. The system of claim 1, wherein the indicia represent a dashed line produced on the map on the display tracking the path followed by the subject person within the surveillance region.

3. The system of claim 1, wherein the processing system configured to correlate different types of the data gathering agents to facilitate tracking of the subject person and to display a location of the data gathering agents on the layout.

4. The system of claim 1, wherein the data gathering agents include at least one of a camera, digital video recorder, access control or bio-chemical detector.

5. The system of claim 1, wherein the database stores zoom maps to be displayed by the control terminal, the zoom maps associated with locations in the surveillance region, the zoom maps illustrating at least one of security gates, airport fairway, parking area, access entrance, or check-in counters in the layout of the surveillance region.

6. The system of claim 1, wherein the data gathering agents monitor a large surveillance area through which multiple individuals travel.

7. The system of claim 1, wherein the processing system is programmed to index the signatures within the subject dossier to permit incremental searches for individuals within the surveillance region.

8. The system of claim 1, wherein the processing system is programmed to perform classification and matching of the signatures.

9. The system of claim 1, wherein the data gathering agents collect information about at least one of a walking pattern or gait of the subject, the processing system programmed to analyze the at least one of a walking pattern or gait of the subject person.

10. The system of claim 1, wherein the data gathering agents collect information about at least one of an iris scan and facial features of the subject person.

11. The system of claim 1, wherein the data gathering agents collect information in connection with multiple individuals, the processing system programmed to prioritize the information and analyzing a portion of the information to make an initial estimate of which of the individuals are candidate individuals for a potential match to the subject person, the processing system programmed to incrementally add other portions of the information to the analysis to assess which of the candidate individuals match the subject person.

12. The system of claim 1, wherein the processing system is programmed to apply a monitoring rule wherein at least one of the data gathering agents monitors a particular area in the surveillance region and when an individual loiters in the particular area for more than a select period of time, the processing system declares an alert.

13. The system of claim 1, wherein the processing system is programmed to direct at least one of the data gathering agents to zoom in on a face of the individual, and the processing system programmed to attempt to match the face of the individual to a watch list.

14. The system of claim 1, wherein at least one of the data gathering agents scans data on at least one of a smart card or an identification (ID) card.

15. The system of claim 1, wherein the data gathering agents collect biometric signatures, temporal information and object tracking locations, the biometric signatures including at least one of hair color, skin tone/color, weight, build, or height, the temporal information including at least one of speed, direction, location, past places visited, path, or past activities.

16. The system of claim 1, wherein the data gathering agents comprises first and second data gathering agents that are positioned to monitor different first and second areas in the surveillance region, wherein the subject person travels out of a view of the first data gathering agent and into a view of the second data gathering agent as the subject person travels out of the first area and into the second area.

17. The system of claim 16, wherein the data gathering agents collect multiple data streams including one or more of facial features, vocal, fingerprint, iris scan, DNA data, soft biometric data, temporal data and used data.

18. The system of claim 16, wherein the data-gathering agents comprise at least one of a camera, chemical sensor, motion detector, door access sensor, capacitive sensor, biometric sensor, optical sensor, infrared sensor, or security alarm sensor, having a corresponding view of the first or second areas in the surveillance region.

19. A surveillance method comprising:
monitoring a surveillance region with multiple data gathering agents disposed throughout the surveillance region to provide corresponding signatures identifying aspects of a subject person in the surveillance region, the signatures including one or both of biometric information or temporal information;
storing a map of a layout for the surveillance region;
aggregating the signatures associated with the subject person to produce a subject dossier including one or both of biometric information or temporal information corresponding to the subject person;
correlating the data gathering agents, the subject dossier and the map; and
displaying the map of the layout for at least a portion of the surveillance region and producing indicia on the map tracking a path followed by the subject person within the surveillance region, the indicia based on the signatures in the subject dossier and the data gathering agents.

20. The method of claim 19, wherein the indicia represent a dashed line produced on the map when displayed tracking the path followed by the subject person within the surveillance region.

21. The method of claim 19, further comprising correlating signatures from different types of the data gathering agents to facilitate tracking of the subject person and displaying a location of the data gathering agents on the layout.

22. The method of claim 19, wherein the data gathering agents including at least two of a camera, digital video recorder, access control or bio-chemical detector.

23. The method of claim 19, further comprising storing and displaying zoom maps associated with locations in the surveillance region, the zoom maps illustrating at least one of security gates, check-in counters, airport fairway, parking area, access entrance, or check-in counters in the layout of the surveillance region.

24. The method of claim 19, further comprising indexing the signatures within the subject dossier and performing incremental searches for individuals within the surveillance region.

25. The method of claim 19, further comprising performing classification and matching of the signatures.

26. The method of claim 19, wherein the information in the signatures includes collecting information about at least one of a walking pattern or gait of the subject, the method analyzing the at least one of a walking pattern or gait of the subject person.

27. The method of claim 19, wherein the information in the signatures includes information about at least one of an iris scan and facial features of the subject person.

28. The method of claim 19, further comprising collecting information in connection with multiple individuals, prioritizing the information, analyzing a portion of the information to make an initial estimate of which of the individuals are candidate individuals for a potential match to the subject person, and incrementally adding other portions of the information to the analysis to assess which of the candidate individuals match the subject person.

29. The method of claim 19, further comprising\applying a monitoring rule wherein at least one of the data gathering agents monitors a particular area in the surveillance region and when an individual loiters in the particular area for more than a select period of time, declaring an alert.

30. The method of claim 19, further comprising directing at least one of the data gathering agents to zoom in on a face of the individual, and attempting to match the face of the individual to a watch list.

31. The method of claim 19, further comprising scanning data on at least one of a smart card or an identification (ID) card.

32. The method of claim 19, further comprising collecting biometric signatures, temporal information and object tracking locations, the biometric signatures including at least one of hair color, skin tone/color, weight, build, or height, the temporal information including at least one of speed, direction, location, past places visited, path, or past activities.

33. The method of claim 19, further comprising positioning first and second data gathering agents, from the multiple data gathering agents, to monitor different first and second areas in the surveillance region, wherein the subject person travels out of a view of the first data gathering agent and into a view of the second data gathering agent as the subject person travels out of the first area and into the second area.

34. The method of claim 19, wherein the data gathering agents collect multiple data streams including one or more of facial features, vocal, fingerprint, iris scan, DNA data, soft biometric data, temporal data and used data.

35. The method of claim 19, wherein the data-gathering agents comprise at least one of a camera, chemical sensor, motion detector, door access sensor, capacitive sensor, biometric sensor, optical sensor, infrared sensor, or security alarm sensor, having a corresponding view of the first or second areas in the surveillance region.

* * * * *